C. KOCH.
AUTOMATIC SIGNAL FOR VEHICLES.
APPLICATION FILED MAY 12, 1914.
1,129,691.
Patented Feb. 23, 1915.
2 SHEETS—SHEET 1.
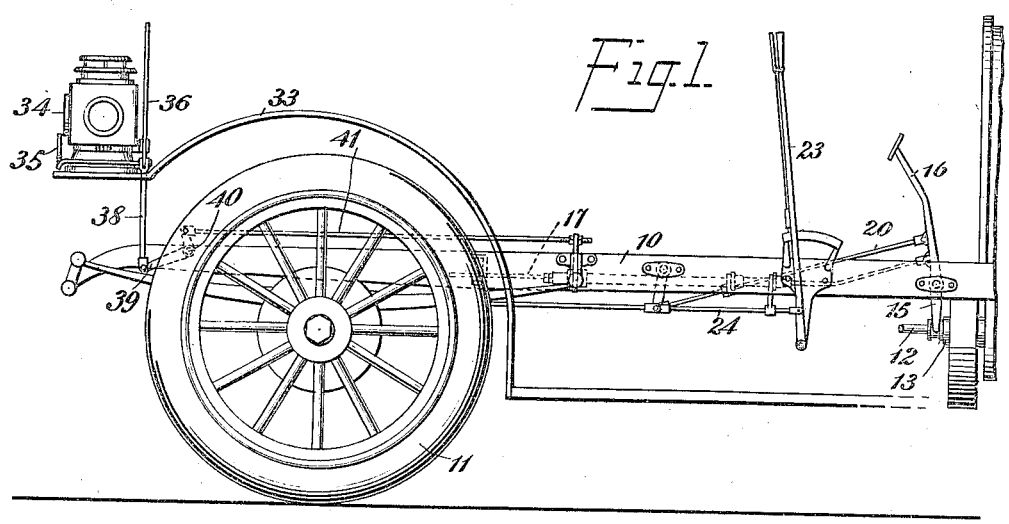
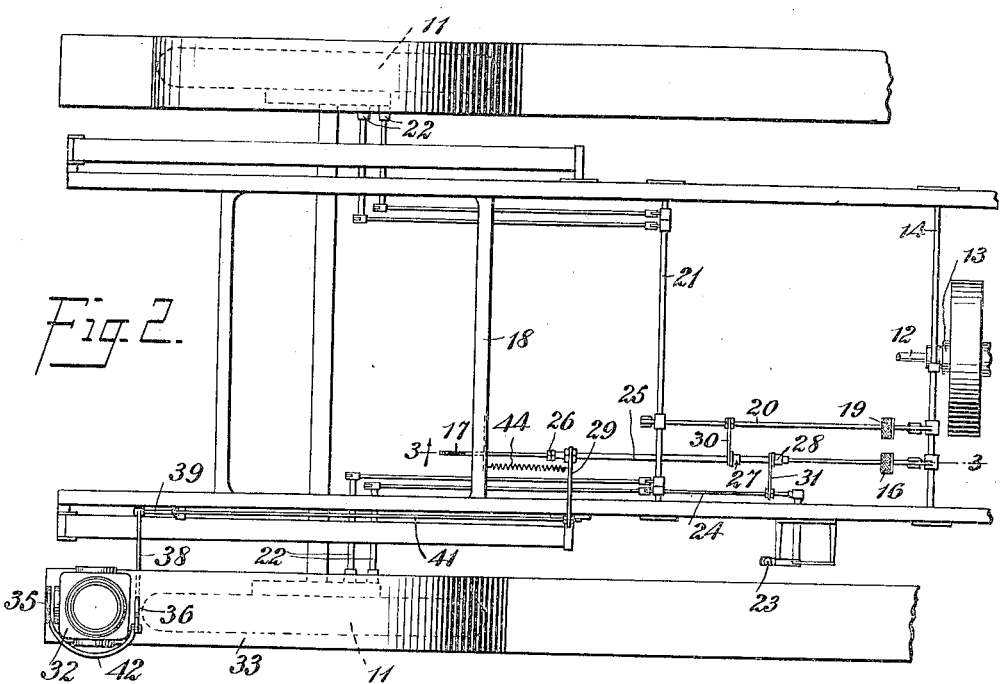
WITNESSES
INVENTOR
Charles Koch
BY
ATTORNEYS

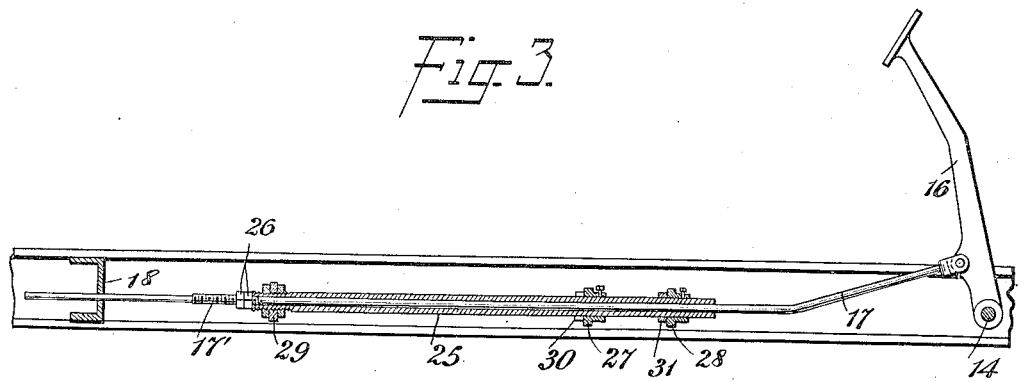
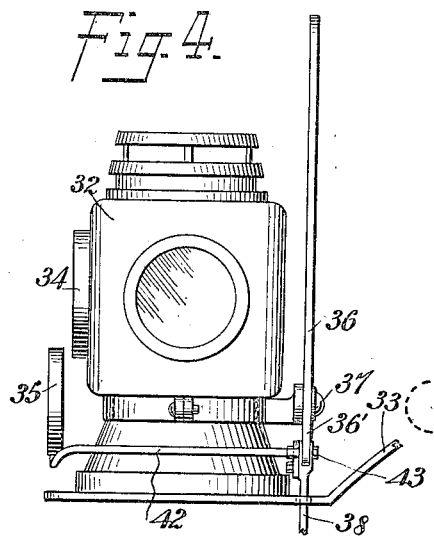
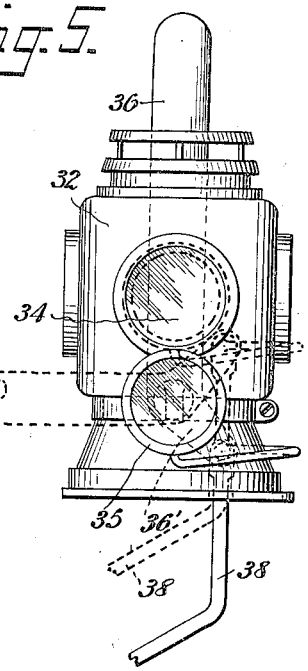
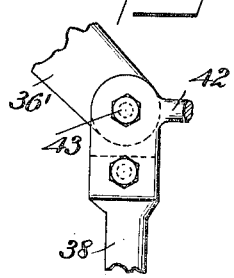

UNITED STATES PATENT OFFICE.

CHARLES KOCH, OF NEW YORK, N. Y.

AUTOMATIC SIGNAL FOR VEHICLES.

1,129,691.  Specification of Letters Patent.  Patented Feb. 23, 1915.

Application filed May 12, 1914. Serial No. 838,106.

*To all whom it may concern:*

Be it known that I, CHARLES KOCH, a citizen of the United States, and a resident of the city of New York, borough of Manhattan, in the county and State of New York, have invented a new and Improved Automatic Signal for Vehicles, of which the following is a full, clear, and exact description.
This invention relates to vehicles and has particular reference to signaling devices therefor.

One of the objects of the invention is to provide for a vehicle such, for instance, as an automobile, a rear end signal adapted to be operated automatically in connection with some of the usual controlling elements of the machine.

More definitely stated, this invention comprehends the employment of an automobile chassis having any ordinary or improved driving and controlling devices which, *per se*, have no special bearing upon this invention, and having at its rear end a signal device either in the form of an arm for daylight use or a lamp for night use, made effective simultaneously with the manipulation of any of the usual control devices, and hence requiring no special thought on the part of the chauffeur.

The foregoing and other objects of the invention will hereinafter be more fully described and claimed and illustrated in the drawings forming a part of this specification in which like characters of reference indicate corresponding parts in all the views, and in which—

Figure 1 is a side elevation of sufficient of an automobile chassis to illustrate the nature of the invention; Fig. 2 is a plan view of the same; Fig. 3 is a detail view on the line 3—3 of Fig. 2; Fig. 4 is a view of the signal mechanism corresponding to Fig. 1 but on a larger scale; Fig. 5 is a rear elevation of the parts shown in Fig. 4, certain of the parts being shown in changed position in dotted lines; and Fig. 6 is a detail of the detachable signal yoke connection.
The several parts of the device may be made of any suitable materials, and the relative sizes and proportions, as well as the general design of the mechanism, may be varied to a considerable extent without departing from the spirit of the invention hereinafter more fully set forth and specifically claimed.

Referring more particularly to the drawings I show at 10 a fragment of a chassis supported upon wheels 11, and indicating a power shaft 12. I also show a conventional form of clutch device 13 associated with the power shaft and motor.

At 14 is shown a rock shaft to which is connected a fork 15 adapted to control the shifting of the clutch 13, and said rock shaft is adapted to be operated by means of a foot lever 16 of any suitable or conventional construction and operation. I attach to the lever 16 an actuating rod 17, the same extending thence rearwardly and guided at its rear end through a cross bar 18 of the chassis.

At 19 I indicate a foot brake lever having a rod 20 leading rearwardly to a rock shaft 21 whereby the brake elements 22 will be controlled in the usual manner. For emergency purposes I show also a hand lever 23 having a rod 24 connected for control of the brake elements either independently of or in connection with the foot brake lever 19. The bars 20 and 24 operate in vertical planes substantially parallel to that of the bar 17 and preferably on opposite sides thereof.

Having reference particularly to Fig. 3, I provide a sleeve 25 loosely mounted upon the rod 17 and slidable longitudinally thereof within certain limits. The rod 17 is threaded at 17′, and nuts 26 located thereon are adapted to abut against the rear end of the sleeve 25 under normal conditions. At 27 I show a collar adjustably secured upon the sleeve and spaced rearwardly from a single collar 28 likewise secured to the sleeve adjacent the front end thereof. The rear end of the sleeve is threaded and has locked thereto a laterally projecting arm 29. The foot brake rod 20 has an arm 30 secured thereto and extending laterally therefrom into loose engagement with the rear face of the collar 27. Likewise the rod 24 has secured to it an arm 31 bearing loosely against the rear face of the collar 28.

From the mechanism thus far described it will be understood that the forward movement of the clutch lever rod 17 will cause, through the nuts 26, a forward thrust of the sleeve 25 and a forward movement of the arm 29. The forward movement of either of the rods 20 and 24 will cause, through the arm 30 or 31, as the case may be, a forward movement of the sleeve 25 whether the rod 17 is moved or not, and hence the arm 29 will likewise be given a forward impulse.

As a suitable illustration of the signal mechanism, I show a lamp casing 32 supported in any suitable manner upon the mud guard 33 of one of the rear wheels and having a window 34 in its rear vertical wall. The color of the window may be white, or any other suitable tint, for normal running purposes.

At 35 I show a screen having a glass of a different tint from the window 34, and adapted to be moved into or out of alinement with said window. The normal position of the screen is shown in full lines in Figs. 4 and 5, uncovering the window.

At 36 I show a bell crank journaled on a horizontal pivot 37 in front of the lamp casing, the longer arm of which extends normally vertically and largely secluded by the lamp casing. The shorter arm 36' of the bell crank extends normally downwardly and outwardly from the pivot 37 and has connected to it a link 38 pivoted at its lower end to a bell crank 39 journaled on a horizontal pivot 40, and whose other arm is connected by means of a forwardly extending rod 41 to the aforesaid laterally projecting arm 29. The screen 35 is supported upon a yoke 42 detachably connected by means of a screw 43 constituting the pivot connection between the bell crank 36 and the link 38.

When the arm 29 is moved forwardly by any of the means aforesaid, causing the rod 41 to move forwardly, the bell crank 39 swinging around its pivot 40 will push forwardly upon the link 38, causing the movement of the bell crank or signal arm 36 inwardly and downwardly from the normal position shown in Figs. 4 and 5 to the dotted line position of Fig. 5, indicating to any person in the rear of the vehicle that the vehicle is about to stop. Said arm 36 may be equipped with any desired legend or it may indicate by a peculiar color or otherwise the fact indicated. Simultaneously with the movement of the bell crank the screen 35 will be moved upwardly and cause the lamp to glow with a danger color. For daylight use the screen 35 may be arranged in any desired position by unscrewing the pivot arm 43 which holds the yoke 42 in place. It will be observed, therefore, that the controlling devices, looking toward the shutting off of the power connection or the setting of the brakes under the usual conditions, operate automatically and without special attention on the part of the driver to display the desired signal. The restoration of the control devices to running condition will set the sleeve 25 free to allow the return of the signal device to normal position under the influence of a spring 44 located at any desired place as, for instance, between the arm 29 and the cross bar 18.

Having thus described my invention, I claim as new and desire to secure by Letters Patent:—

1. In a device of the character set forth, the combination with a vehicle and a series of independently operable control devices including rods arranged in parallel vertical planes, of a rear end signal device, a sleeve mounted upon one of said control rods and movable forwardly along the same, a laterally projecting arm secured to said sleeve, connections between said arm and said signal device, and means between said sleeve and each of the control rods for the operation of the sleeve and signal device upon the operation of any one of the control devices independently of the others.

2. The combination with a vehicle frame and a series of control devices therefor including a plurality of rods arranged in vertical planes parallel to the longitudinal axis of the vehicle, of a rear end signal device, a sleeve loosely mounted upon the intermediate control rod and movable forwardly thereon, an arm rigidly connected to the rear end of said sleeve and extending laterally therefrom, connections between said arm and said signal device through which the signal device is made effective simultaneously with the forward movement of the sleeve, means on the rear end of said rod on which said sleeve is mounted for direct engagement with the rear end of the sleeve, spaced collars adjustably secured on the front end of the sleeve, and an arm rigidly connected to each of the side control rods and having loose slidable engagement with the rear face of one of said collars, substantially as set forth.

In testimony whereof I have signed my name to this specification in the presence of two subscribing witnesses.

CHARLES KOCH.

Witnesses:
Geo. L. Beeler,
Philip D. Rollhaus.

Copies of this patent may be obtained for five cents each, by addressing the "Commissioner of Patents, Washington, D. C."